United States Patent [19]

Arai et al.

[11] 4,111,810
[45] Sep. 5, 1978

[54] DESALINATION REVERSE OSMOTIC MEMBRANES AND THEIR PREPARATION

[75] Inventors: Shigeru Arai, Yachiyo; Fumio Akiya, Urawa, both of Japan

[73] Assignee: Shin-Etsu Chemical Company, Tokyo, Japan

[21] Appl. No.: 778,269

[22] Filed: Mar. 16, 1977

Related U.S. Application Data

[63] Continuation-in-part of Ser. No. 685,632, May 12, 1976, abandoned, which is a continuation of Ser. No. 448,212, Mar. 5, 1974, abandoned.

[30] Foreign Application Priority Data

Mar. 8, 1973 [JP] Japan ................................. 48/27267

[51] Int. Cl.$^2$ ............................................. B01D 13/00
[52] U.S. Cl. ............................ 210/23 H; 210/500 M
[58] Field of Search ............... 210/22, 500 M, 321 R, 210/321 B; 536/20; 260/2.5 A; 428/304; 204/180 P, 296, 301; 55/16, 158; 264/49; 417/244–246

[56] References Cited

U.S. PATENT DOCUMENTS

| 2,040,880 | 5/1936 | Rigby | 536/20 |
| 2,361,000 | 10/1944 | Zender | 210/500 M X |
| 3,228,876 | 1/1966 | Mahon | 210/22 |

Primary Examiner—Frank A. Spear, Jr.
Attorney, Agent, or Firm—Toren, McGeady and Stager

[57] ABSTRACT

Semipermeable membranes useful in reverse osmosis and a process of preparing them comprising deacetylating naturally occurring chitin to produce chitosan, making a film of chitosan salt from an acid diluted aqueous solution of the chitosan, converting the film of chitosan salt to a film of chitosan having free amino groups by neutralizing the acid groups, and then subjecting the film of chitosan to a chemical treatment with an organic acid, by which to convert the chitosan to the acetylated form, having a degree of acetylation from about 0.3 to 0.8, to produce the reverse osmotic membranes.

The products have excellent chemical properties as well as mechanical strengths sufficient to withstand the pressure difference in the operating condition.

4 Claims, No Drawings

DESALINATION REVERSE OSMOTIC MEMBRANES AND THEIR PREPARATION

CROSS REFERENCE TO RELATED APPLICATIONS

This application is a Continuation-in-Part of copending application Ser. No. 685,632, filed May 12, 1976, now abandoned which, in turn, was a Continuation of Ser. No. 448,212, filed Mar. 5, 1974, now abandoned.

BACKGROUND OF THE INVENTION

1. Field of the Invention

This invention relates to semipermeable membranes useful in reverse osmosis and a process of making them.

2. Description of the Prior Art

Reverse osmosis has been an object of intense study for the purposes of separating water from an aqueous solution of organic or inorganic solutes, and particularly, for the desalination of sea water. The principle of reverse osmosis is well known. The most critical factor in this technique is in the use of a semipermeable membrane having adequate physical and mechanical properties. The membranes should be keenly selective relative to the species to be transported even with very small pressure differences. They must have sufficient mechanical strengths to withstand against the pressure difference in the operating conditions and also high durability for a long period of continuous service.

As the semipermeable membranes useful in the reverse osmosis, there have been proposed those prepared from cellulose derivatives, such as, cellulose acetate, and polyamide or nylon. Among them, products from cellulose acetate have been considered superior. However, the cellulose acetate membranes are still not perfect and have the following defects:

1. they are sensitive to chemical attacks by alkalis or acids leading to a deterioration in their properties;
2. consequently, the pH range of the treating solutions usable in the process is limited;
3. they have low resistance against organic solvents and poor durability and are not adaptable to a wide temperature range.

SUMMARY OF THE INVENTION

It is an object of the present invention to introduce a novel permeable membrane for use in reverse osmosis techniques and which is free of the above-described defects and has excellent chemical properties as well as improved mechanical strengths.

It is another object of the invention to provide a process of preparing such a product from chitin as the starting material, which occurs abundantly in animals, e.g., arthropods and plants, e.g., fungi, and is usually not utilized.

Particularly, the present invention provides a reverse osmotic membrane having excellent semipermeability and good resistance to acids and water. These membranes are a film composed of chitosan in which at least part of the free amino groups have been uniformly acetylated, the degree of acetylation being from about 0.3 to 0.8.

The membrane of the present invention is prepared by a novel process comprising first forming a film from an aqueous solution of chitosan salt, neutralizing the acid groups therein, and acetylating the free acid groups in the film to a degree of acetylation from about 0.3 to 0.8, the acetylation being carried out at a temperature from about 10° to 50° C and for a time period from about 40 to 150 hours. As a result of using this process, membranes having good permeability can be produced.

DESCRIPTION OF THE PREFERRED EMBODIMENT

The intermediate raw material, chitosan, of the semipermeable membrane of the present invention is prepared from chitin which occurs widely in nature as a main component of, for example, the shells of crustaceans and cell membranes of centain kinds of fungi. The proteins and glucosides bonded to chitin by coordination are removed by a conventional process and the liberated chitin is then deacetylated by treatment with a strong alkali to produce chitosan.

Chitosan is soluble in an aqueous acid solution by forming a salt with the acid. The films of chitosan salt are prepared by making use of this property. Chitosan is dissolved in a diluted aqueous solution of an acid, such as, hydrochloric or acetic acid, which eventually contains a water-miscible organic solvent, such as, acetone, ethanol or formamide. The solution thus obtained is then spread in an appropriate thickness on a horizontal plate and the solvent is evaporated to give a film of the chitosan salt. The addition of a known swelling agent, such as, magnesium perchlorate or zinc chloride results in higher water-permeability of the membrane.

The films of chitosan salt are then converted to chitosan films, having free amino groups in their structure by neutralizing the acid groups with an aqueous diluted solution of an inorganic alkali, such as, sodium hydroxide or potassium hydroxide or an organic base, such as, pyridine.

The course of the above processes for the manufacture of the film of chitosan from the starting material, chitin, by an intermediate product, film of chitosan salt, may be represented by the following:

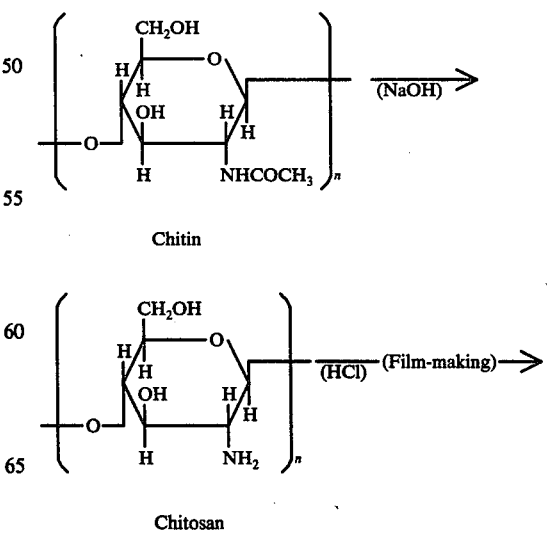

-continued

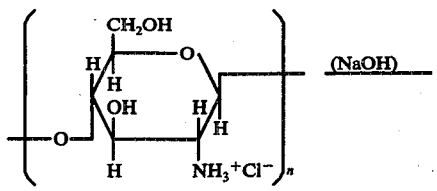

Film of chitosan salt

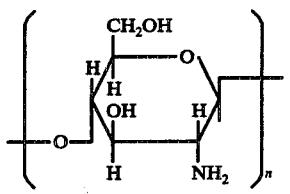

Film of chitosan

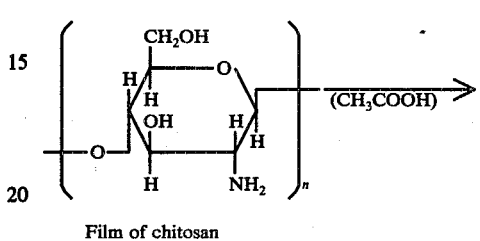

Film of chitosan

Then the above film of chitosan is subjected to a chemical treatment with an organic acid or an acid anhydride by which chitosan is converted to the acetylated form which is stable and useful as a reverse osmotic membrane.

The acetylation process usually comprises swelling the film of chitosan with water and then subjecting the swollen film to chemical reaction in the presence of an organic solvent miscible with water, such as, formamide, dimethylformamide, methylformamide, ethylformamide, or ethanol. Further the addition of a dehydrating condensing agent, such as, dicyclohexylcarbodiimide or a surfactant may help to smoothly accelerate the reaction. The chemical reagents usable for the acetylation of the free amino groups are exemplified by carboxylic acids, such as, acetic acid and propionic acid and those containing SH groups, such as, thioglycolic acid and thiosalicylic acid, and their anhydrides.

We have found that the method by which the acetylation is carried out exerts a significant effect on semipermeability of the resulting membrane. In general, semipermeability may be determined by measuring (usually in percentage) the permeation and desalination to which it is directly related. As the degree of acetylation increases, the desalination and permeation decrease, the properties decreasing sharply when the degree of acetylation exceeds 0.8.

On the other hand, when the degree of acetylation is about 0.2 or lower, the permeation and desalination are relatively high, but the resistance of the film to acids and water is quite low so that the product is not suitable for use as a membrane. Thus, the degree of acetylation should be between about 0.3 to 0.8.

We have further found that the appropriate degree of acetylation can be obtained by controlling both the temperature and time period of the acetylation. Specifically, temperatures exceeding 70° C tend to sharply accelerate the acetylation reaction. This makes it not only more difficult to control the degree of acetylation, but also, for a given degree of acetylation results in nonuniformity of the acetylation, and, consequently, poor permeation and desalination properties. In this regard, even if the degree of acetylation is within the range specified for the present invention, if the acetylation process was not carried out in accordance with the above noted conditions of the present invention, the reverse osmotic properties, i.e., permeability and desalination, will be inferior.

A preferred reverse osmotic membrane is one which is based on the film of chitin material prepared by partial acetylation of the film of chitosan. As the acetylating reagent, acetic acid or acetic anhydride which do not damage the physical properties of chitin material, e.g., resistance to acids and stability in hot air or water are recommended. The acetylation of the film of chitosan for conversion to the film of chitin by acetic acid is as follows:

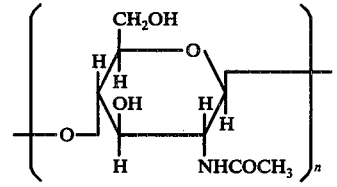

Film of chitin

In the acetylation of the free amino groups in the chitosan film, the degree of acetylation must be determined depending on the properties of the aqueous solution of inorganic or organic solutes from which the water is to be separated in the reverse osmotic technique and also on the degree of purification to be obtained or, for example, in case of desalination of sea water, the salt concentration of the desalted water.

The reverse osmotic membranes prepared according to the invention have a strong structure like chitin and excellent thermal and chemical stability and exhibit mechanical strength sufficient for the pressure difference in the operating condition.

The following examples illustrate the present invention:

EXAMPLE 1

A 20% solution of chitosan in 0.30 N hydraulic acid was spread in a uniformly thick coating over a glass plate and allowed to stand to allow the water therein to evaporate and produce a film 0.02 mm thick. This film was dipped in a 5% aqueous solution of sodium hydroxide for 30 minutes. The thus treated film was washed with pure water until the washing water became neutral.

Pieces of the resulting chitosan film were placed into a solution consisting of 100 g of pyridine, 5 g of dicyclohexylcarbodiimide (as a dehydrating condensing agent) and 10 g of acetic anhydride (as an acetylating agent) and then subjected to an acetylation reaction at room temperature over the varied periods of time as indicated in Table 1. The products obtained were the desired semipermeable chitin membranes in accordance with the present invention.

The content of acetyl groups in each product and the corresponding degree of acetylation are shown in Table 1. For the purpose of determining the degree of acetylation herein, an acetyl content of 23.0% by weight corresponds to 1.0 degree of acetylation.

To determine the permeability of the films, a 2.5% aqueous solution of sodium chloride was placed upon the surface of each of the membranes supported by an underlying board which is porous and stiff and a pressure of 100 kg/cm$^2$ was applied. As a result, the rate of permeation, which is expressed in 10$^{-3}$ml per square cm per second and the desalination percentage, are set forth in Table 1.

TABLE 1

|  | Reaction Period | | | |
|---|---|---|---|---|
|  | 40 hours | 70 hours | 100 hours | 200 hours |
| Acetyl content (% by weight) | 9.0 | 16.7 | 19.0 | 21.0 |
| Acetylation degree | 0.39 | 0.73 | 0.83 | 0.91 |
| Permeation rate ($\times 10^{-3}$ml/cm$^2$/sec.) | 1.0 | 1.4 | 0.5 | 0.1 |
| Desalination percentage | 80 | 94 | 70 | 50 |

As can be seen from Table 1, as the degree of acetylation goes above about 0.8, notwithstanding the fact that relatively mild acetylation conditions have been used, the permeation rate and desalination percentage drop off sharply.

EXAMPLE 2

Chitosan films were prepared, treated and subjected to acetylation in accordance with the same procedure and conditions as in Example 1, except that the acetylation reaction was carried out at various temperatures as indicated in Table 2 over varying periods of time. However, the acetyl content was held constant at about 16% by appropriate combinations of conditions of time and temperature. The reaction periods as well as the exact acetyl contents and the corresponding acetylation degrees are set forth in Table 2.

The rate of permeation and the desalination percentage for each of the chitin membranes thus produced was determined in the same manner as in Example 1. The results are set forth in Table 2.

TABLE 2

|  | Reaction Temperature and Period | | | | |
|---|---|---|---|---|---|
|  | 10° C 150 hrs. | 20° C 70 hrs. | 50° C 40 hrs. | 70° C 20 hrs. | 100° C 12 hrs. |
| Acetyl content (% by weight) | 16.5 | 16.7 | 16.8 | 16.8 | 17.0 |
| Acetylation degree | 0.72 | 0.73 | 0.73 | 0.73 | 0.74 |
| Permeation ($\times 10^{-3}$ml/cm$^2$/sec.) | 1.3 | 1.4 | 1.2 | 0.8 | 0.2 |
| Desalination percentage | 90 | 94 | 91 | 81 | 60 |

As can be seen from Table 2, at a constant degree of acetylation within the range required in the present invention, if the reaction conditions are not within the scope of the present invention, the permeation and desalination properties become less favorable.

What is claimed is:

1. In a method for desalinating water wherein the water is treated with a reverse osmotic membrane, the improvement which comprises using a reverse osmotic membrane prepared by forming a film with an aqueous acid solution of chitosan salt, neutralizing the acid groups contained therein, and then acetylating the free amino groups therein to achieve a degree of acetylation of 0.3 to 0.8, said acetylation reaction being carried out at a temperature within the range of about 10° to 50° C for a time period from about 40 to 150 hours.

2. The process of claim 1 wherein the acetylation is carried out by reaction with a carboxylic acid selected from the group consisting of acetic acid, propionic acid and anhydrides thereof.

3. The process of claim 1 wherein the acetylation is carried out by reaction with a carboxylic acid selected from the group consisting of thioglycolic acid and thiosalicyclic acid.

4. The process of claim 1 wherein the acetylation reaction is carried out at room temperature.

* * * * *